US012600519B2

(12) United States Patent
Bonardi

(10) Patent No.: US 12,600,519 B2
(45) Date of Patent: Apr. 14, 2026

(54) LABELING STATION IN LABELING MACHINES FOR PRE-ADHESIVE LABELS

(71) Applicant: P.E. LABELLERS S.P.A., Porto Mantovano (IT)

(72) Inventor: Luca Bonardi, San Giorgio Bigarello (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 74 days.

(21) Appl. No.: 18/689,482

(22) PCT Filed: Aug. 5, 2022

(86) PCT No.: PCT/EP2022/072080
§ 371 (c)(1),
(2) Date: Mar. 6, 2024

(87) PCT Pub. No.: WO2023/036527
PCT Pub. Date: Mar. 16, 2023

(65) Prior Publication Data

US 2024/0351730 A1 Oct. 24, 2024

(30) Foreign Application Priority Data

Sep. 7, 2021 (IT) ........................ 102021000023069

(51) Int. Cl.
*B65C 9/18* (2006.01)
*B65C 9/00* (2006.01)

(52) U.S. Cl.
CPC .......... *B65C 9/1869* (2013.01); *B65C 9/0006* (2013.01); *B65C 2009/0096* (2013.01)

(58) Field of Classification Search
CPC ... B65C 9/0006; B65C 9/1865; B65C 9/1869; B65C 2009/0087; B65C 2009/0096; B65C 9/18; B65C 9/1892; Y10T 156/1705–171
See application file for complete search history.

(56) References Cited

U.S. PATENT DOCUMENTS 8,187,399 B2 * 5/2012 Biernat .................... B65C 3/16 156/367
2006/0266479 A1 11/2006 Stenner
(Continued)

FOREIGN PATENT DOCUMENTS

WO 2016/075507 A1 5/2016

OTHER PUBLICATIONS

European Patent Office, International Search Report and Written Opinion issued Nov. 22, 2022 which pertains to PCT Application No. PCT/EP2022/072080. 9 pgs.

*Primary Examiner* — Carson Gross
(74) *Attorney, Agent, or Firm* — THOMPSON HINE LLP

(57) ABSTRACT

A labeling station in labeling machines for pre-adhesive labels, including a feeding assembly with unwinding rollers of a respective spool of backing tape with adhesive labels applied thereto and at least one assembly for applying the labels which has a peeling device located proximate to the containers to be labeled and adapted to separate the individual labels from the backing tape for application, and at least two mutually composable parts, respectively a first part, which includes a first support which forms a first worktable, on which the application assembly is mounted, and a second part, which includes a second support, on which at least the feeding assembly is mounted. The feeding assembly further includes a splicing system for joining the backing tapes which are unwound from the unwinding
(Continued)

rollers and a group of dandy rolls, while at least one first redirection roller is mounted on the first worktable.

4 Claims, 5 Drawing Sheets

(56) References Cited

U.S. PATENT DOCUMENTS

| | | | | |
|---|---|---|---|---|
| 2017/0313461 | A1* | 11/2017 | Saccardi | B65C 9/1807 |
| 2020/0087014 | A1* | 3/2020 | Pedercini | B65C 9/1892 |

* cited by examiner

LABELING STATION IN LABELING MACHINES FOR PRE-ADHESIVE LABELS

The present invention relates to a labeling station in labeling machines for pre-adhesive labels.

Labeling machines are known which label containers by means of pre-adhesive labels associated with a backing tape.

Generally, these machines have a conveyor for the containers, constituted by a carousel, around which at least one labeling station is arranged which transfers the labels separated from the backing tape to the containers arriving on the carousel.

In particular, the labeling stations have, on a substantially horizontal worktable, a feeding assembly which comprises at least one unwinding roller, which unwinds a respective spool of backing tape with the labels applied, in order to feed it to a label application assembly, located on the same worktable, which has a peeling device located in the immediate vicinity of the containers to be labeled and separates the individual labels from the backing tape in order to apply them to the respective containers.

Usually, the labeling station is also provided with a recovery roller around which the backing tape that is now without labels is rewound.

Labeling stations of this type are also known in which, in the feeding assembly, there are two unwinding rollers supporting respective spools of the label backing tape, so that once one of the two spools of backing tape is exhausted it is possible to start the unwinding of the other spool that is present, after the operator has manually spliced the backing tape about to end with the new backing tape.

These labeling stations require, between the feeding assembly and the label application assembly, a backing tape accumulation buffer to provide the operator with the time needed to perform the maneuvers for manual splicing of the two backing tapes, with a consequent increase in the space occupation of the labeling station.

Another drawback of currently known labeling stations of this type resides in that the operator, in order to intervene on the spools, must work using a ladder, with the evident inconveniences and risks involved.

Moreover, known labeling stations must be replaced completely if the operator wishes to mount backing tape spools of a different format on the unwinding rollers.

The aim of the present invention is to provide a labeling station in labeling machines for pre-adhesive labels that is capable of improving the background art in one or more of the aspects above mentioned.

Within this aim, an object of the invention is to provide a labeling station in labeling machines for pre-adhesive labels that is simpler to manage for the operator and has greater compactness than those of the background art.

Another object of the invention is to provide a labeling station that can be adapted easily and quickly to the different processing requirements.

A further object of the present invention is to provide a labeling station that requires fewer adjustment interventions by the operators with respect to the background art.

A further object of the present invention is to overcome the drawbacks of the background art in a manner that is alternative to any existing solutions.

Not least object of the invention is to provide a labeling station that is highly reliable and relatively easy to provide and has a competitive production cost.

This aim and these and other objects which will become better apparent hereinafter are achieved by a labeling station in labeling machines for pre-adhesive labels according to claim 1, optionally provided with one or more of the characteristics of the dependent claims.

Further characteristics and advantages of the invention will become better apparent from the description of preferred but not exclusive embodiments of the labeling station in labeling machines for pre-adhesive labels according to the invention, illustrated by way of non-limiting example in the accompanying drawings, wherein.

Figure 1:
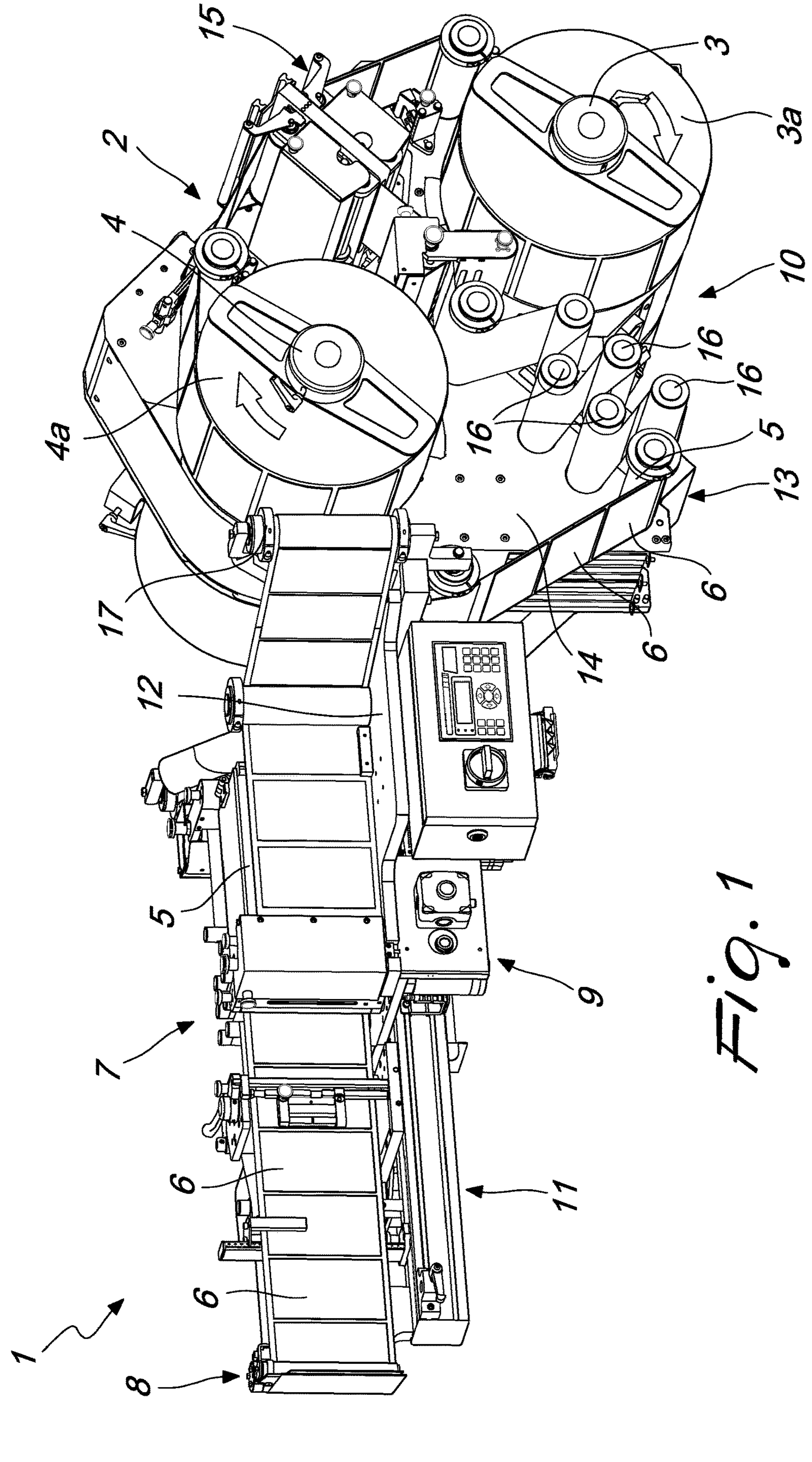
FIG. 1 is a perspective view of the labeling station according to the invention.
Figure 2:
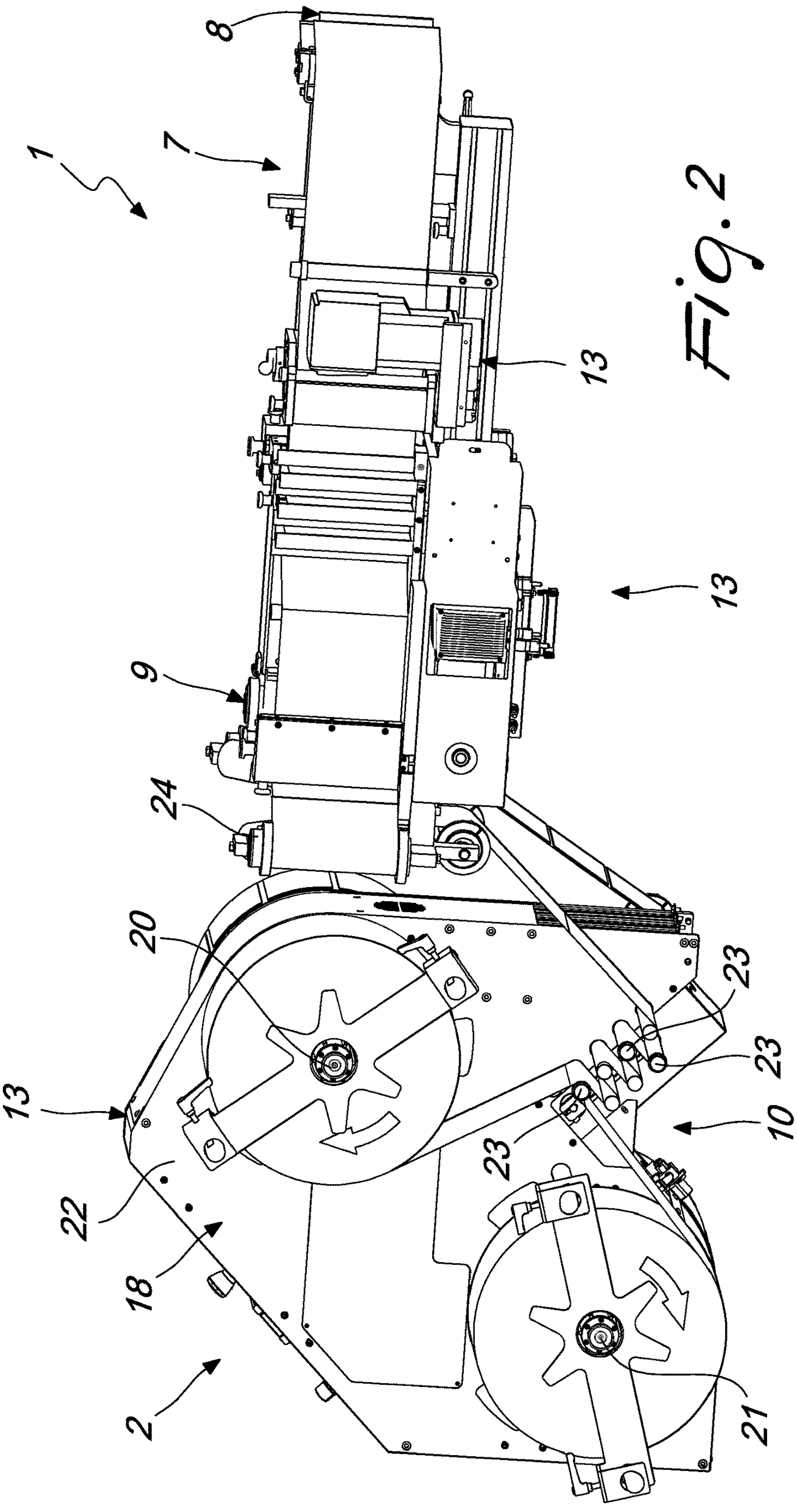
FIG. 2 is a perspective view, from a different angle, of the labeling station according to the invention.
Figure 3:
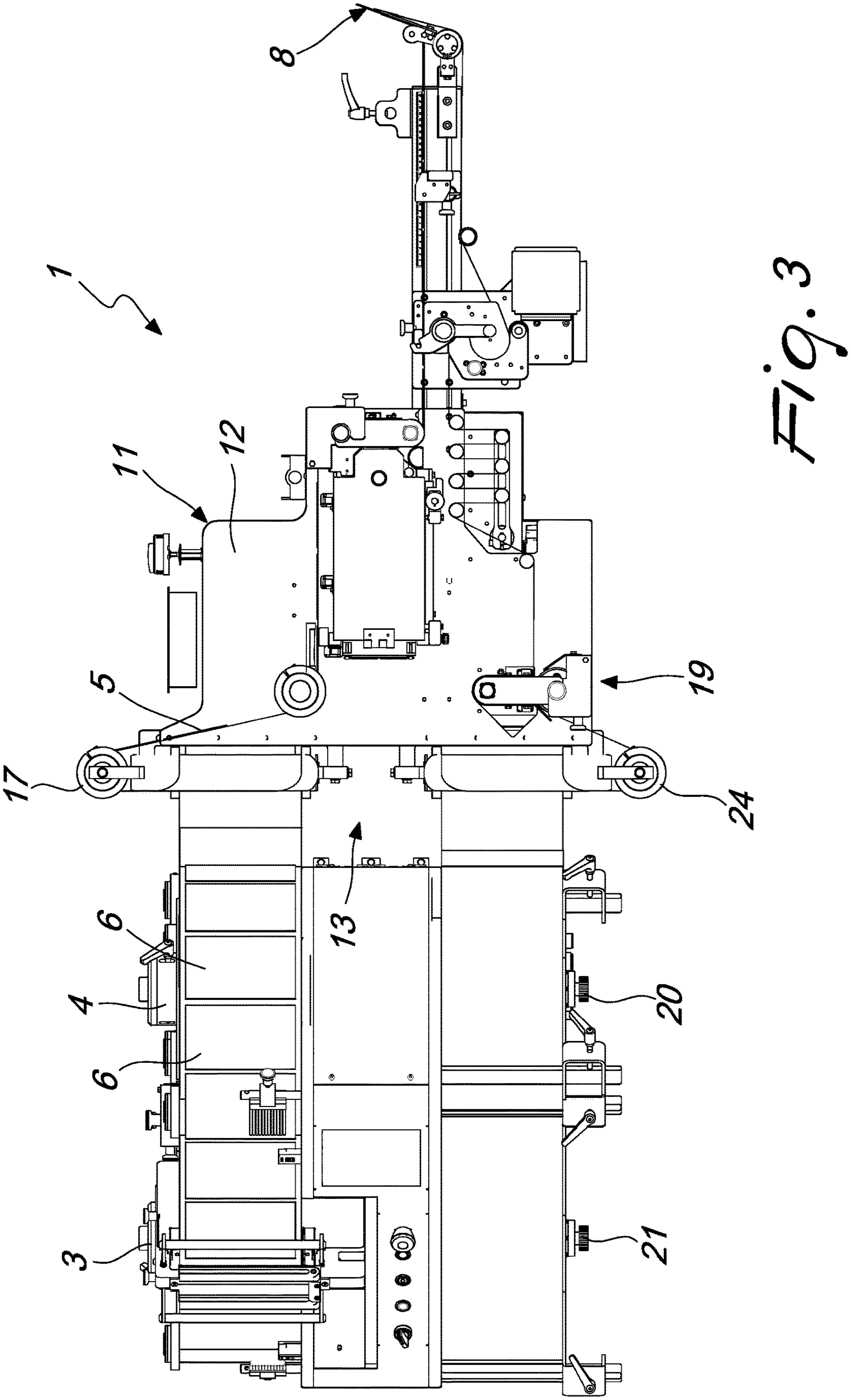
FIG. 3 is a top plan view of the labeling station according to the invention.
Figure 4:
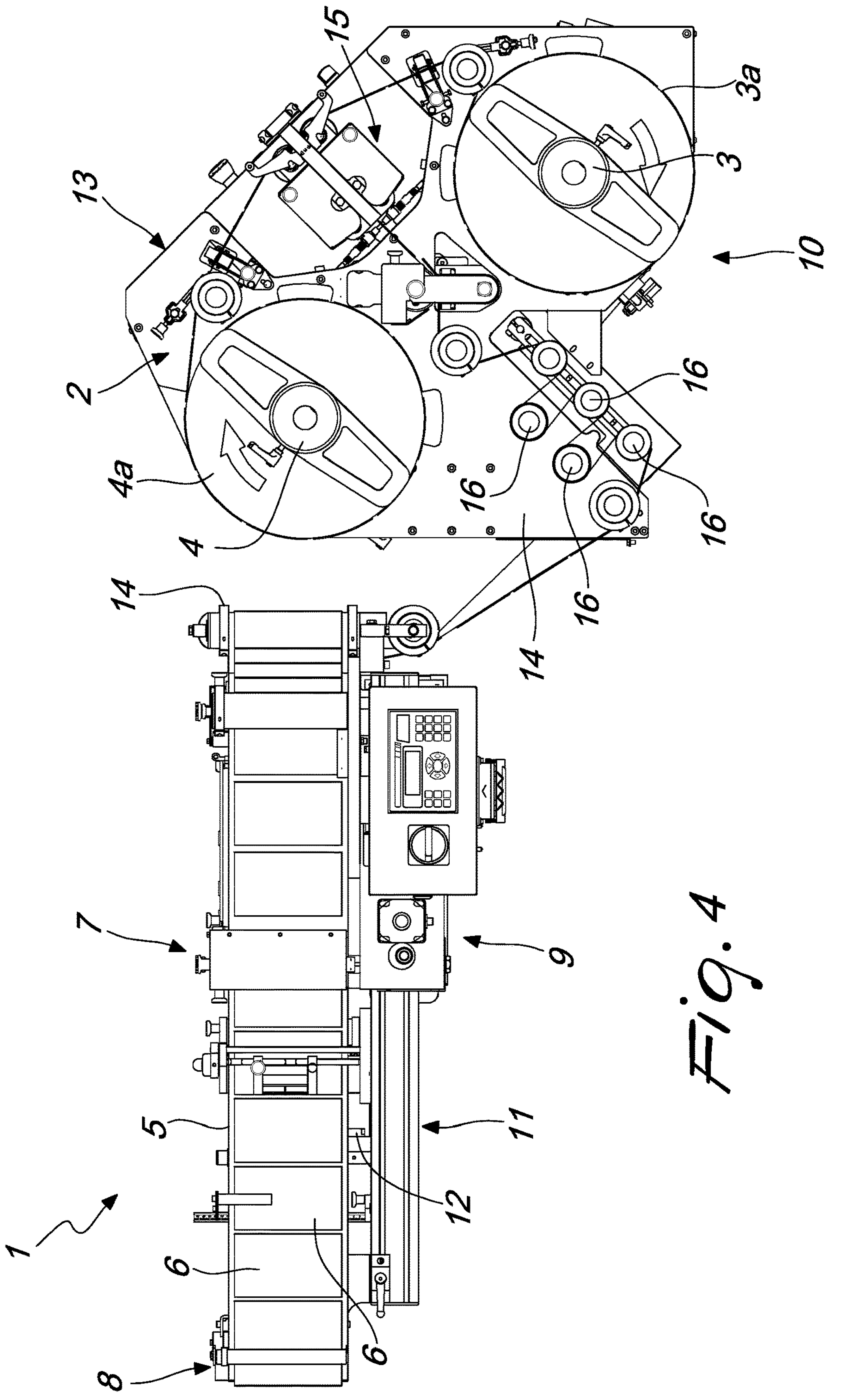
FIG. 4 is a side view of the labeling station according to the invention.
Figure 5:
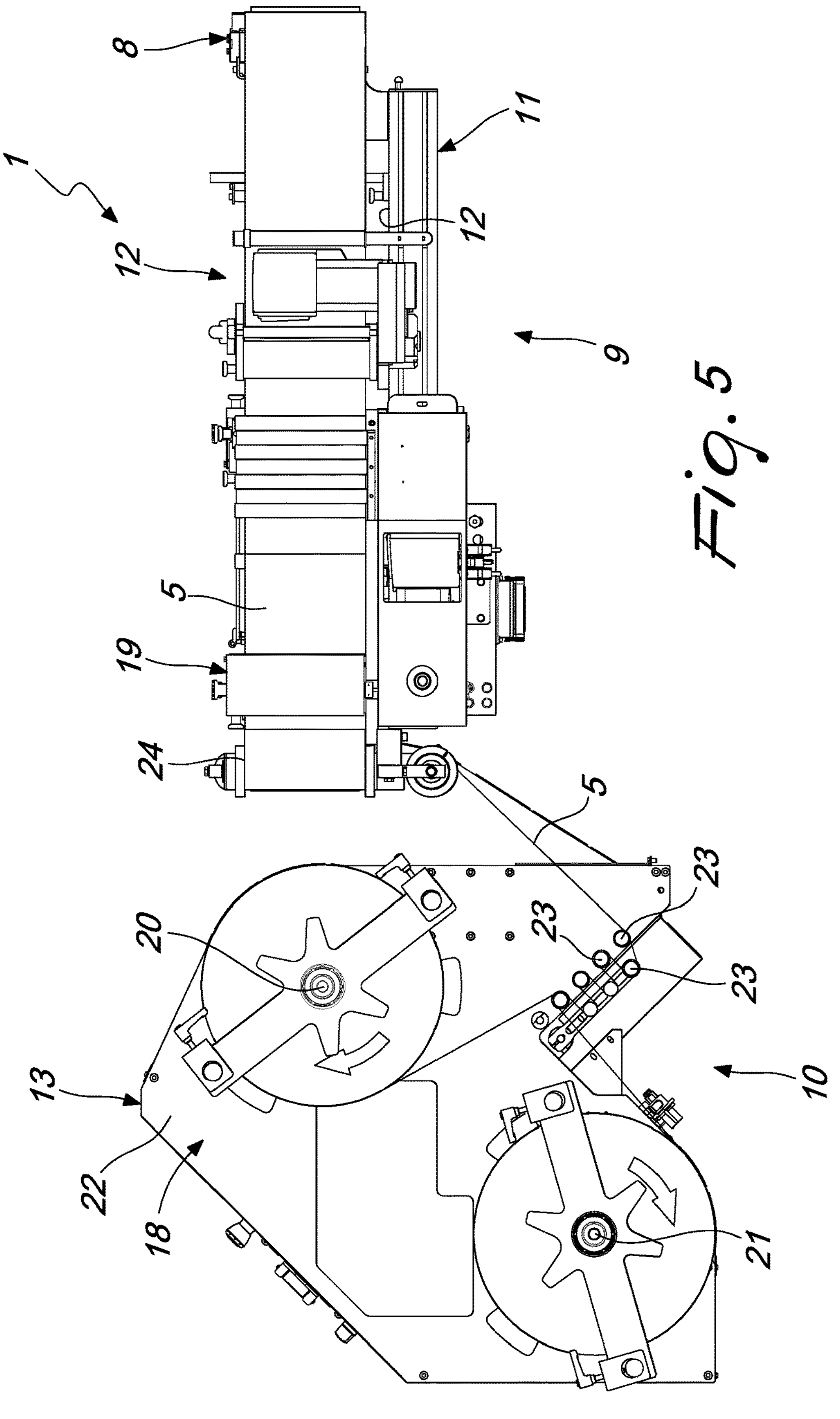
FIG. 5 is a side view, opposite to the view of FIG. 4, of the labeling station according to the invention.

With reference to the figures, the labeling station in labeling machines for pre-adhesive labels according to the invention, generally designated by the reference numeral 1, comprises a feeding assembly 2 that has at least rollers 3 and 4 for the unwinding of a respective spool 3*a*, 4*a* of backing tape 5 with adhesive labels 6 applied thereto.

The labeling station according to the invention comprises, moreover, at least one assembly 7 for applying the labels 6, which is directed toward a conveyor for the containers to be labeled, not shown, which may be constituted by a rotating carousel or a conveyor belt.

The application assembly 7 has, in particular, a peeling device 8 located proximate to the containers to be labeled, which separates the individual labels 6 from the backing tape 5 in order to apply them to the respective containers arriving from the conveyor.

The labeling station according to the present invention comprises at least two parts 9 and 10 which are mutually composable in order to form such labeling station.

In particular, there is a first part 9, which comprises a first support 11 which defines a first substantially horizontal worktable 12, on which the assembly 7 for the application of the labels 6 is mounted, and a second part 10, which can be combined detachably with the first part 9 and comprises a second support 13 which is provided in a separate block with respect to the first support 11 and which, in turn, forms at least one second worktable 14 which is extended instead substantially vertically and on which at least the feeding assembly 2 of the backing tape 5 is mounted.

Conveniently, in each instance, it is possible to combine with the first part 9 different second parts 10 which carry feeding assemblies 7 capable of unwinding spools of backing tape 5 of mutually different formats, so as to be able to easily adapt the labeling station to the different working requirements without requiring its complete replacement.

It should be noted that the first part 9 and, in particular, the first support 11 may be mounted on a body fixed to the conveyor of the containers, like a peninsula protruding radially from the peripheral region of the carousel or from a carriage arranged adjacent to the conveyor, while the second part 10, and particularly the second support 13, may be rested on the ground by means of separate supports, such as for example a tripod or the like.

Also according to the invention, the feeding assembly 2 is provided with per se known automatic joining means 15, which are arranged downstream of the unwinding rollers 3 and 4 and allow, without any manual intervention by the operators, to cut, in response to an activation signal emitted upon depletion of one of the spools 3*a*, 4*a*, the backing tape

5 that arrives from the spool about to be depleted and splice it to the backing tape 5 of the other spool that is not yet used, providing the alternating operation of the unwinding rollers 3, 4.

The presence of the automatic joining means 15, besides considerably reducing the intervention times required for the operator, makes the presence of an accumulation buffer of the backing tape 5 unnecessary, with consequent reduction of the total space occupation of the labeling station.

Furthermore, it should be noted that the substantially vertical arrangement of the second worktable 14 allows the operator to mount comfortably the new spools and remove the depleted ones from the unwinding rollers 3, 4, without resorting to ladders, as in the background art.

In output from the automatic joining means 15, the backing tape 5 is taken by a group of dandy rolls 16, also mounted on the second worktable, which allow to compensate the transition from the continuous advancement speed given to the backing tape 5 by the feeding assembly 2 to the intermittent advancement speed that is instead given to the backing tape 5 at the application assembly 7 by traction means 19 placed on the first worktable 12, in order to allow the transfer of the labels 6 to the individual containers transported by the conveyor.

The unwinding rollers 3, 4 are actuated in rotation by respective motors which are controlled by a common driver or electronic controller, while an automatic selector alternately places the driver in communication with the electric motor of the unwinding roller 3, 4 that is called in each instance to perform the unwinding of the spool 3*a*, 4*a* of backing tape 5 mounted thereon.

The rotation of the unwinding rollers 3, 4 is performed by the driver so that the group of dandy rolls 16 is, in each step, in a correct working condition.

Also on the first worktable 12, and more precisely at the end of the worktable 12 that is directed toward the feeding assembly 2, at least one first redirection roller 17 is mounted which engages the backing tape 5 being unwound from the feeding assembly 2, so as to orient the portion of the backing tape 5 that advances over the first worktable 12 so that its plan of arrangement is arranged substantially at right angles to the first worktable 12.

The arrangement of the first redirection roller 17 on the first worktable 12, instead of on the second worktable 14, allows to reduce the adjustment operations necessary for the correct advancement of the backing tape 5 at the application assembly 7.

Advantageously, the labeling station according to the invention is also provided with at least one assembly 18 for recovering the backing tape 5 without the labels 6.

According to a possible embodiment, not shown, the recovery assembly 18 can be provided by at least one winding roller which is supported rotatably by the first worktable 12 and allows to rewind the backing tape 5 that arrives from the peeling device 8 without the labels 6.

According to a different embodiment, shown in the figures, the recovery assembly 18 comprises at least two rewinding rollers 20 and 21 designed to receive alternatively the backing tape 5 without the labels 6.

In this case, the rewinding rollers 20, 21 are mounted rotatably on a third worktable 22, which is extended substantially vertically and is defined by the second support 13, on the opposite side with respect to the second worktable 14.

The two rewinding rollers 20, 21 are actuated by motor means and operate alternatively with respect to each other, in that a rewinding roller is actuated rotationally until the spool being formed on it has reached a preset size; then the other one, previously stationary, is connected to the backing tape 5 and started in order to start the forming of a new spool.

The rewinding rollers 20, 21 are sized so as to support spools having the same dimensions as those that can be mounted on the unwinding rollers present on the first worktable 14 of said second support 13.

Also on the third worktable 22, upstream of the rewinding rollers 20, 21, there is a system of dandy rolls 23.

Again in this case, on the first worktable 12 there is at least one second redirection roller 24 which engages the portion of backing tape 5 without the labels 6 that arrives from the first worktable 12 in order to orient it so as to be received in the correct orientation by the rewinding rollers 20, 21.

The operation of the labeling station according to the invention is as follows.

Based on the size of the spools 3*a*, 4*a* or of the format of the labels 6 that the operator wishes to use, the operator proceeds to pair the application assembly 7 mounted on the first support 11 arranged proximate to the conveyor of the containers with a second support 13 which carries, on the second worktable 14, suitably sized unwinding rollers 3, 4.

The operator then prepares the labeling station so that the backing tape 5 being unwound from one of the spools 3*a*, 4*a* mounted on the unwinding rollers 3, 4 passes through the automatic joining means 15 and through the group of dandy rolls 16.

The operator then distends the backing tape 5 that arrives from the spool initially unwound on the application assembly 7, engaging it around the first redirection roller 17, and after making it pass through the peeling device 8 and the traction means 19 makes it pass around the second redirection roller 24 and around the system of dandy rolls 23 of the third worktable 22 and then connects it to one of the two rewinding rollers 20, 21.

At this point, the machine can be started to label the containers.

When the spool mounted on the unwinding roller 3, 4 that is operating is depleted, the automatic joining means 15 are activated and cut the backing tape 5 being unwound and splice it to the backing tape 5 of the spool that has not yet been unwound. At this point, the active unwinding roller is stopped and the selector activates in order to put the driver in communication with the motor of the other unwinding roller, which is then started so as to begin to unwind the spool mounted thereon.

The operator then intervenes to mount a new spool on the unwinding roller that carried the depleted spool.

In practice it has been found that the invention achieves the intended aim and objects, providing a labeling station that can be easily set up to treat spools of backing tape of the labels suitable for the processing that one intends to perform, without requiring its complete replacement.

The labeling station according to the invention also has the advantage that it is less bulky than known ones and requires fewer adjustments and smaller interventions by the operators with respect to the background art.

The invention thus conceived is susceptible of numerous modifications and variations, all of which are within the scope of the appended claims; all the details may furthermore be replaced with other technically equivalent elements.

In practice, the materials used, so long as they are compatible with the specific use, as well as the contingent shapes and dimensions, may be any according to the requirements and the state of the art.

The disclosures in Italian Patent Application No. 102021000023069 from which this application claims priority are incorporated herein by reference.

The invention claimed is:

1. A labeling station in labeling machines for pre-adhesive labels, comprising:

a feeding assembly provided at least with unwinding rollers of a respective spool of backing tape with adhesive labels applied thereto and at least one assembly for applying the labels which has a peeling device located proximate to containers to be labeled and configured to separate the labels from the backing tape for application to respective containers, further comprising at least two mutually composable parts, respectively a first part, which comprises a first support which forms a first substantially horizontal worktable, on which said application assembly is mounted, and a second part, which is configured to be combined detachably with said first part and comprises a second support which forms at least one second worktable which extends substantially vertically and on which at least said feeding assembly is mounted, said feeding assembly comprising automatic means for joining the backing tapes which are unwound from said unwinding rollers and a group of dandy rolls which engages the backing tape unwinding from the corresponding unwinding roller, at least one first redirection roller being mounted on said first worktable and engaging the backing tape being unwound in order to orient a portion of the backing tape that advances above said first worktable with a plan of arrangement thereof arranged substantially at right angles to said first worktable;

a recovery assembly for recovering the backing tape without the labels, wherein the recovery assembly comprises at least two rewinding rollers which are designed to receive alternately the backing tape without the labels and are mounted rotatably on a third worktable, which extends substantially vertically and is defined by said second support, on an opposite side with respect to said second worktable, wherein on said first worktable there is at least one second redirection roller which engages the portion of the backing tape without the labels that arrives from the first worktable in order to orient said portion so that the portion is received by said rewinding rollers.

2. The labeling station according to claim 1, wherein rotation axes of said unwinding rollers and rotation axes of said rewinding rollers extend substantially perpendicular to a web feed direction toward a label apply end of said first part.

3. The labeling station according to claim 1, wherein the at least one first redirection roller is mounted on a first side of said first worktable at a location laterally outward of said application assembly in a first direction, wherein the at one second redirection roller is mounted on a second side of said first worktable at a location that is laterally outward of said application assembly in a second direction that is opposite to said first direction.

4. The labeling station according to claim 1, wherein the first support is mounted on a body fixed to a conveyor of containers, and the second support is separately rested on the ground by separate supports.

* * * * *